(No Model.) 2 Sheets—Sheet 1.

E. STECK.
VEHICLE BRAKE.

No. 321,546. Patented July 7, 1885.

Witnesses
L. C. Hills
W. B. Masson.

Inventor:
Ernst Steck
by E. E. Masson
atty (No Model.) 2 Sheets—Sheet 2.

E. STECK.
VEHICLE BRAKE.

No. 321,546. Patented July 7, 1885.

Witnesses:
L. C. Hills
W. B. Masson

Inventor:
Ernst Steck
by E. E. Masson
atty

UNITED STATES PATENT OFFICE.

ERNST STECK, OF CHICAGO, ILLINOIS, ASSIGNOR TO THE FIRE EXTINGUISHER MANUFACTURING COMPANY.

VEHICLE-BRAKE.

SPECIFICATION forming part of Letters Patent No. 321,546, dated July 7, 1885.

Application filed March 2, 1883. (No model.)

*To all whom it may concern:*

Be it known that I, ERNST STECK, a citizen of the United States, residing at Chicago, in the county of Cook and State of Illinois, have invented certain new and useful Improvements in Brakes, of which the following is a specification.

My invention relates to the brake mechanism of vehicles, and although designed in this particular instance for hook-and-ladder, hose, and fire-engine running-gear, it is also adapted to other classes and kinds of vehicles for use on ordinary roadways, and it is particularly applicable to that portion of the running-gear of all of these classes of vehicles which is pivotally connected to the body of the vehicle, or to the remaining or non-pivotally connected portion of the running-gear thereof, the main object of the invention being to provide a brake mechanism which is capable of use when the vehicle to which it is attached or in which it is incorporated is moving in any direction, straight or curved, or when at rest, with the foward wheels of the same occupying positions relatively to the body or hind wheels which said forward wheels assume in going in any direction; and my invention consists in certain features hereinafter described, and specially set forth in the claims.

Figure 1:
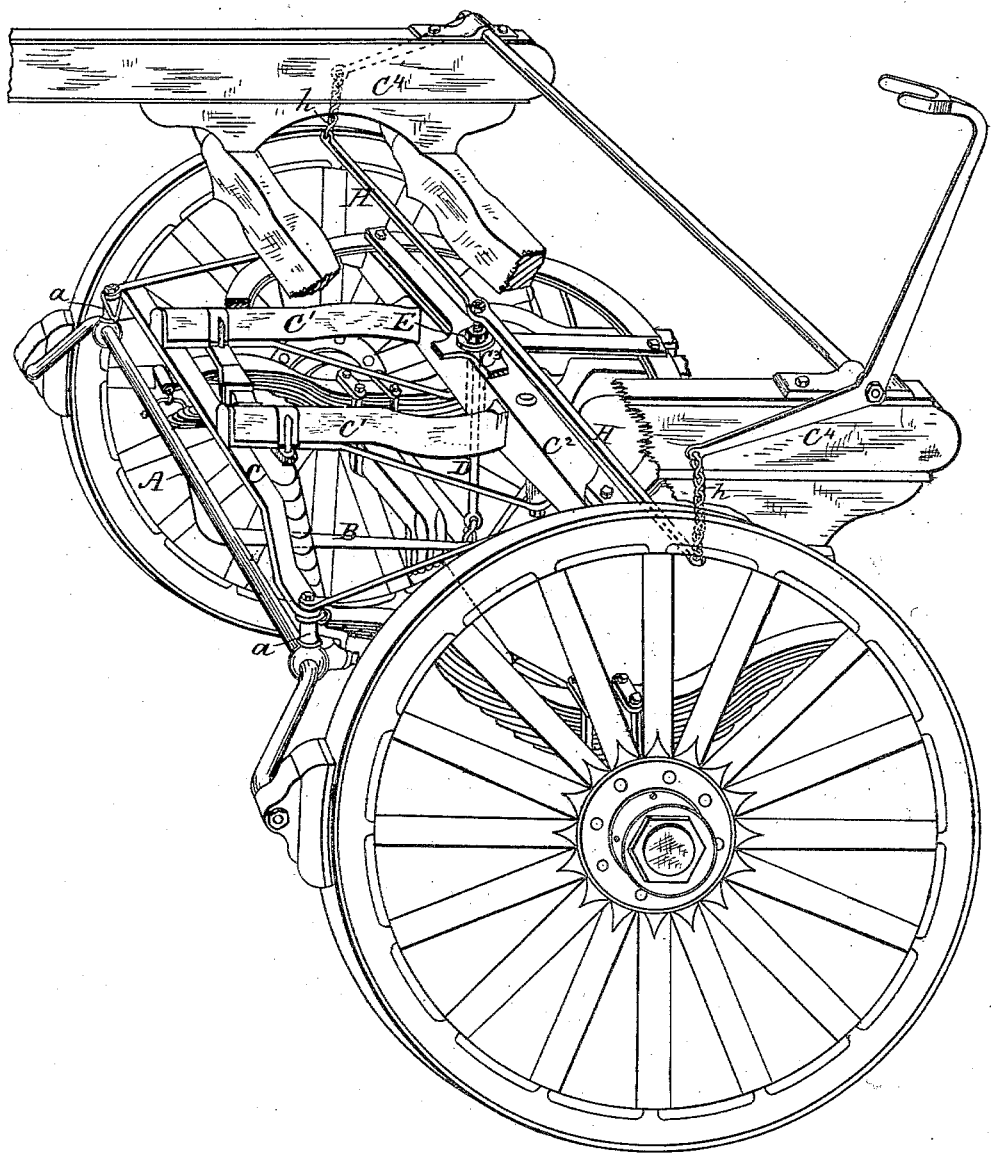
Figure 2:
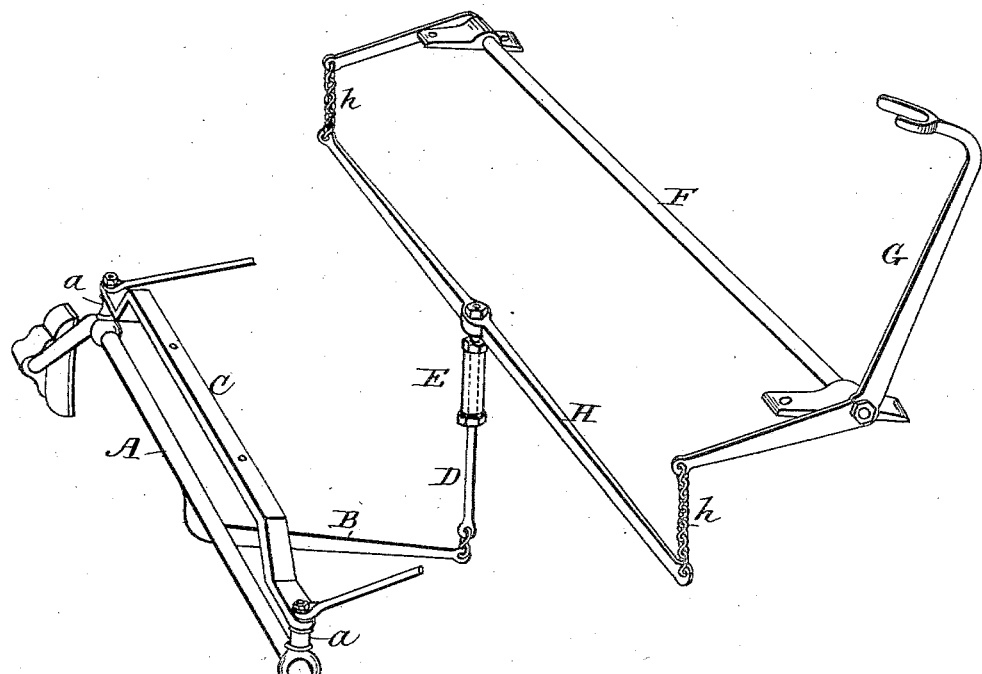
Figure 3:
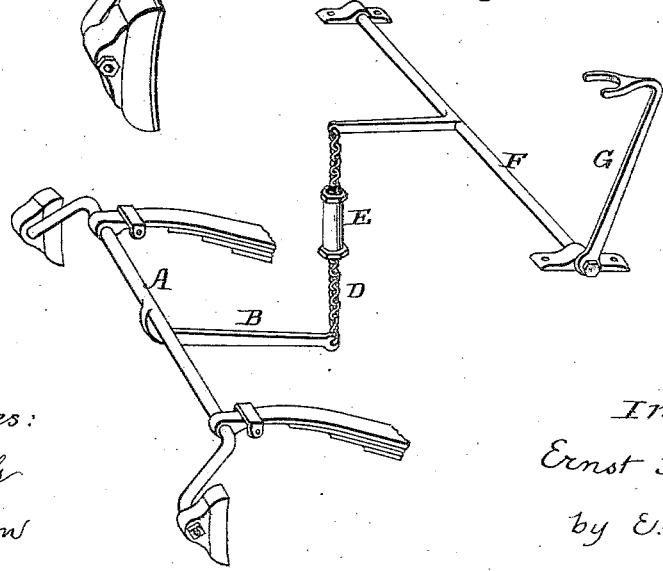

Referring to the accompanying drawings, forming a part hereof, Figure 1 is a perspective of a forward truck of a vehicle adapted for use on common roadways, in which is embodied the brake mechanism constructed in accordance with my invention, some of the parts being broken away to clearly show said invention. Fig. 2 is a skeleton or detached view of the essential and associated elements of the brake mechanism itself. Fig. 3 is a modification of the same.

Like letters refer to like parts in all the figures.

A represents an ordinary brake-shaft, to which is rigidly connected an arm, B, for operating the same. In Figs. 1 and 2 I have illustrated the said shaft as supported in bearings $a$, depending from and secured to a bar, C, bolted to the hounds C', and the latter are secured to the head-block C² of the lower half of the fifth-wheel of the truck; but I do not limit myself to this particular manner of supporting the brake-shaft, as any other suitable point of support may be selected, according to the judgment of the maker and the character of the running-gear to which the brake is applied. In Fig. 3 I show it connected with the springs of the running-gear. So, also, any suitable well-known devices may be employed for throwing or forcing or keeping the brakes free from the wheels when not otherwise operated upon or put in contact therewith. In this instance the weight of the arm B and the parts connected therewith is sufficient to overbalance the weight of the brake blocks, and thus said arm and parts by gravity act to depress one end of the lever and hold the blocks free from the wheels when the brake is not in use. The king-bolt E, seated in the head-block C² of the lower half of the fifth-wheel and in the hub C³ of the upper half, and connecting the body or framework C⁴ of the vehicle with the truck in the usual manner, is made hollow, and a rigid or a flexible link or links, D, pivotally or flexibly secured to the free end of the arm B, passes through this hollow king-bolt, and is pivotally or flexibly secured at its opposite end to a cross-bar, H. As thus far described, it will be seen that by elevating the link D the arm B is elevated at its free end, and, being rigidly attached to the brake-shaft, rotates the same in its bearings, and thus the brake-blocks are applied to the wheels; and that by depressing said link the opposite movement of the brake-blocks is accomplished, and that the link D, being preferably at the center or at a point within the circumference of the king-bolt, may be elevated and depressed (no matter what position the wheels may occupy relative to that of the body of the vehicle) to operate the brake, and this, too, without any reference to the mechanism employed to operate the link. Therefore I do not wish to be understood as herein limiting myself to the particular mechanism shown and described for operating said link, but reserve the right to use any suitable well-known mechanism for so operating said link. Moreover, I do not confine myself to a rigid connection between the arm B and cross-bar H through the hollow king-bolt, for such connection may be made by a wire cable or a chain, as shown in Fig. 3, and any suitable connection between the arm B and cross-bar H may be made, so long as it passes through the hollow king-bolt. In this instance I illustrate two forms of means for elevating and depressing the link D, which comprises a rock-shaft, F, secured to or upon the frame-work C⁴, or it may be to any suitable portion of the body of the vehicle. One of the arms of the rock-shaft is in this instance extended to form the brake-lever G, and both of said arms are flexibly connected by chains $h$ to a cross-bar, H, pivotally or flexibly secured to the link D or the mechanism connecting the cross-bar H with the arm B. It will be seen that the pivotal or flexible connection of the bar and the link permits a change in the relative positions of the wheels and body without any change in the position of the link, either vertically or rotatively, and the bar H, so far as the latter movement of the link is concerned, might be rigidly secured to the frame-work, except for the necessary vertical movements thereof agreeing with the same movements of the link in order to operate the brake-shaft arm. Therefore the flexible connection of the bar H may be dispensed with, and a rigid connection adapted to vertical movement may be substituted therefor; but I prefer the flexible connection, as it gives greater freedom of relative movement in all directions to the body-wheels and brake mechanism.

It will be understood that the cross-bar H is particularly adapted to hook-and-ladder trucks where room is required for the ladders; but this cross-bar H, though preferably, is not absolutely necessary in hook-and-ladder trucks, or, especially, in other vehicles, for a direct connection may be made between the rock-shaft and the mechanism passing through the king-bolt. In Fig. 3 I have shown such direct connection without the use of the cross-bar H.

By the construction of my invention as illustrated in this instance, it will be seen that separate brake mechanisms may be applied to the front and to the rear trucks of a hook-and-ladder carriage, which, as usually constructed, are both pivotally connected with the body or frame thereof, and that great advantage is gained in the government of the same at all times and under all the varied circumstances in which it is desired to impede or stop its progress, the head-block C² in this instance being the equivalent of the ordinary axle of ordinary vehicles in that the king-bolt is seated therein.

In railway-coaches of that character in which the trucks are pivotally connected with the body, and in all vehicles so constructed, my invention and its accompanying advantages are applicable by the exercise of the ordinary mechanical skill and judgment of persons skilled in the art of their construction. Therefore it is not requisite that further particular description of the details of such applications be given herein.

Having described my invention and its operation, what I claim as new is—

1. The combination of a brake-shaft having a rigidly-connected arm with a flexibly-connected link, a hollow king-bolt through which said link passes, and a rock-shaft flexibly connected with said link and mounted on the portion of a vehicle which is pivotally connected with the fifth-wheel head-block, substantially as described.

2. The combination, with a brake-lever and brake-shaft, of a hollow king-bolt, a link passing therethrough and connected at one end with the brake-lever, and at the other end having a pivotal or flexible connection with the brake-shaft, substantially as described.

3. The combination of a brake shaft pivotally connected to the springs of a running-gear, and having an arm pivotally connected with one end of a link passing through a hollow king-bolt, and a brake-lever connected with the other end of said link, substantially as described.

4. The combination of a brake-shaft having a rigidly-connected arm, a flexibly-connected link, a hollow king-bolt through which said link passes, a bar pivotally connected to said link and flexibly connected to a rock-shaft mounted upon the portion of a vehicle which is pivotally connected with the fifth-wheel head-block, substantially as specified.

5. The combination of the springs of a vehicle with the brake-shaft extending across said vehicle and pivotally connected with said springs, and provided with an operating-lever mounted upon the brake-shaft between said springs, substantially as described.

6. The combination of the brake-shaft A, connecting mechanism D, hollow king-bolt E, cross-bar H, and fifth-wheel head-block C², with a brake-lever mounted on the frame-work C⁴ and flexibly connected to said cross-bar, substantially as shown and described.

7. The combination of the brake-lever G, rock-shaft F, chains $h$, cross-bar H, hollow king-bolt E, connecting mechanism D, arm B, and brake-shaft A, substantially as shown and described.

In testimony whereof I affix my signature in presence of two witnesses.

ERNST STECK.

Witnesses:
E. S. INNET,
ALEX. M. FISKE.